(12) United States Patent
Wiberg et al.

(10) Patent No.: US 10,167,085 B2
(45) Date of Patent: Jan. 1, 2019

(54) NOZZLE AND VANE SYSTEM FOR NACELLE ANTI-ICING

(71) Applicant: General Electric Company, Schenectady, NY (US)

(72) Inventors: Clark George Wiberg, Liberty Township, OH (US); Shiladitya Mukherjee, West Chester, OH (US)

(73) Assignee: General Electric Company, Schenectady, NY (US)

( * ) Notice: Subject to any disclaimer, the term of this patent is extended or adjusted under 35 U.S.C. 154(b) by 357 days.

(21) Appl. No.: 15/008,046

(22) Filed: Jan. 27, 2016

(65) Prior Publication Data

US 2017/0210475 A1    Jul. 27, 2017

(51) Int. Cl.
*B64D 15/04* (2006.01)
*B64D 29/00* (2006.01)
(Continued)

(52) U.S. Cl.
CPC ............. *B64D 15/04* (2013.01); *B64D 27/16* (2013.01); *B64D 29/00* (2013.01); *F02C 7/047* (2013.01);
(Continued)

(58) Field of Classification Search
CPC ........ B64D 15/04; B64D 27/16; B64D 27/18; B64D 27/20; B64D 29/00; F02C 7/047; F05D 2220/323; F05D 2240/128
See application file for complete search history.

(56) References Cited

U.S. PATENT DOCUMENTS 2,125,445 A    8/1938  Holveck
2,734,560 A    2/1956  Harris et al.
(Continued)

FOREIGN PATENT DOCUMENTS

CN    103184935 A    7/2013
CN    104929778 A    9/2015
WO    2014155009 A1    10/2014

OTHER PUBLICATIONS

Internet print-out of https://web.archive.org/web/20140413012423/http://ideas-inspire.com/basic-aerodynamics-with-lesson/ (Apr. 13, 2014).*
(Continued)

*Primary Examiner* — Logan Kraft
*Assistant Examiner* — Christopher R Legendre
(74) *Attorney, Agent, or Firm* — General Electric Company; Pamela Kachur

(57) ABSTRACT

An aircraft anti-icing system includes an inlet lip that includes an outer shell attached to a bulkhead. The inlet lip encloses an annular housing volume. The system further includes one or more vanes extending from the bulkhead into the annular housing volume. Each vane of the one or more vanes includes a first end coupled to the bulkhead, a free end extending into the annular housing volume, and a vane body extending therebetween. The one or more vanes are positioned downstream from a nozzle configured to direct a high temperature gas stream into the annular housing volume in a first direction. The one or more vanes are configured to redirect the high temperature gas stream through a first turn angle from the first direction to a second direction. The second direction is configured to reduce a direct impingement of the high temperature gas stream on an inner surface of the inlet lip.

13 Claims, 8 Drawing Sheets

(51) Int. Cl.
*B64D 27/16* (2006.01)
*F02C 7/047* (2006.01)

(52) U.S. Cl.
CPC .. *F05D 2220/323* (2013.01); *F05D 2240/128* (2013.01); *F05D 2260/201* (2013.01)

(56) References Cited

U.S. PATENT DOCUMENTS

| | | | |
|---|---|---|---|
| 3,401,888 A | 9/1968 | Sutter | |
| 3,559,892 A | 2/1971 | DeLuca | |
| 5,088,277 A | 2/1992 | Schulze | |
| 5,257,498 A | 11/1993 | Nikkanen et al. | |
| 6,267,328 B1 | 7/2001 | Vest | |
| 6,443,395 B1 | 9/2002 | Porte et al. | |
| 6,585,191 B2 | 7/2003 | Andre et al. | |
| 6,702,233 B1* | 3/2004 | DuPont | B64D 15/04 244/134 B |
| 7,185,833 B2 | 3/2007 | Geskin et al. | |
| 7,870,721 B2 | 1/2011 | Winter et al. | |
| 8,061,657 B2 | 11/2011 | Rocklin et al. | |
| 8,402,739 B2 | 3/2013 | Jain et al. | |
| 8,408,491 B2 | 4/2013 | Jain et al. | |
| 8,418,471 B2 | 4/2013 | Baltas | |
| 8,783,619 B2* | 7/2014 | Hormiere | B64D 15/04 244/134 B |
| 8,967,543 B2 | 3/2015 | Saito et al. | |
| 9,488,067 B2* | 11/2016 | Johnson | F02C 7/047 |
| 2001/0003897 A1 | 6/2001 | Porte et al. | |
| 2008/0267762 A1 | 10/2008 | Jain et al. | |
| 2012/0031101 A1 | 2/2012 | Hoffmann et al. | |
| 2015/0198061 A1 | 7/2015 | Johnson et al. | |
| 2016/0017751 A1* | 1/2016 | Caruel | F02C 7/047 415/175 |
| 2017/0210475 A1* | 7/2017 | Wiberg | B64D 15/04 |

OTHER PUBLICATIONS

Machine Translation and First Office Action and Search issued in connection with corresponding CN Application No. 201710056347.1 dated Feb. 7, 2018.

* cited by examiner

NOZZLE AND VANE SYSTEM FOR NACELLE ANTI-ICING

BACKGROUND OF THE INVENTION

The present invention relates to an improvement in anti-icing systems for aircraft jet engine propulsion systems.

The formation of ice on exposed surfaces of aircraft, such as aircraft wings, propellers, and air inlets of engines has been a problem since the earliest days of heavier-than-air flight. Any accumulated ice adds considerable weight, and changes the airfoil or inlet profile, making the aircraft much more difficult to fly and in some cases causing loss of aircraft. In the case of jet aircraft, large pieces of ice breaking loose from the leading edge of an engine inlet housing can damage rotating blades or other internal engine components and cause engine failure.

One of the most common anti-icing techniques has been the ducting of hot gases into a housing adjacent to the likely icing area. Current techniques to solve this problem generally fall into one of two types of systems: impingement style ring systems or swirl nozzle systems. In each case, the hot gas conduits simply introduce hot gases into a housing, such as the leading edge of a jet engine inlet or a wing leading edge. While these systems are generally effective, their efficiency is degraded by the fact that more thermal energy than needed is introduced in localized regions rather than being more efficiently distributed over the domain of interest. A consequence of these localized "hot" spots is an unfavorable impact on the structural integrity of the housing.

In impingement-style ring systems, hot air is impinged on a metal skin forming an engine inlet lip by strategically positioned holes in an annulus shaped tube that runs 360 degrees around the front of the inlet. The air impinges on the internal surface of the metal skin forming the inlet lip, causing the metal temperature to increase and prevent ice accretion.

Existing swirl nozzles discharge the hot air through multiple holes contained within a single housing, and the result is the formation of a hot air jet flow field. The air is discharged at a high velocity so that it creates a swirling effect in the forward most inlet compartment, commonly referred to as the D-duct lip. The air continues to move 360 degrees around the annular D-duct compartment. It circulates around the compartment several times until it exits into the ambient air through an exhaust port. This circulating and/or swirling hot air heats the inlet lip skin and prevents the accretion of ice, thus mitigating the concern for ice shedding off the lip and impinging on rotating engine blades downstream. Although the figures and verbiage of the specification use nose cowl anti-icing for explanatory purposes, the invention disclosed herein may apply to any other housings subject to ice formation, including but not limited to, wing conduits and ducts.

Both existing systems have limitations. The impingement ring style anti-ice systems have a cumbersome tube and support structure that runs 360 degrees around the front inlet compartment. While these systems generally have very high heat transfer ratios, they also add considerable weight to the propulsion system of the aircraft. Swirl nozzle systems are generally significantly lighter than impingement ring style systems and use less air to anti-ice the lip surface. Both systems impart localized jet impingement which can promote structural degradation and suboptimal efficiency.

BRIEF DESCRIPTION OF THE INVENTION

In one embodiment, an aircraft anti-icing system is provided. The system includes an inlet lip with an outer shell attached to a bulkhead. The inlet lip encloses an annular housing volume. The system further includes one or more vanes extending from the bulkhead into the annular housing volume. Each vane of the one or more vanes includes a first end coupled to the bulkhead, a free end extending into the annular housing volume, and a vane body extending therebetween. The one or more vanes are positioned downstream from a nozzle configured to direct a high temperature gas jet into the annular housing volume in a first direction. The one or more vanes are configured to redirect the high temperature gas stream through a first turn angle from the first direction to a second direction. The second direction is configured to reduce a direct impingement of the high temperature gas stream on an inner surface of the inlet lip.

In a second embodiment, a method for preventing icing of an inlet lip of an aircraft engine is provided. The method includes directing a high temperature gas stream at a first direction from a nozzle into an inlet lip that includes an outer shell attached to a bulkhead. The inlet lip encloses an annular housing volume. The method further includes redirecting the high temperature gas stream through a first turn angle from the first direction to a second direction using one or more vanes positioned downstream from the nozzle. The second direction is configured to reduce a direct impingement of the high temperature gas stream on an inner surface of the inlet lip.

In a third embodiment, a jet aircraft with an anti-icing system is provided. The anti-icing system of the jet aircraft includes an inlet lip with an outer shell attached to a bulkhead. The inlet lip encloses an annular housing volume. The anti-icing system of the jet aircraft further includes one or more vanes extending from the bulkhead into the annular housing volume. Each vane of the one or more vanes includes a first end coupled to the bulkhead, a free end extending into the annular housing volume, and a vane body extending therebetween. The one or more vanes are positioned downstream from a nozzle configured to direct a high temperature gas stream into the annular housing volume in a first direction. The one or more vanes are configured to redirect the high temperature gas stream from the first direction to a second direction configured to reduce a direct impingement of the high temperature gas stream on an inner surface of the inlet lip.

BRIEF DESCRIPTION OF THE DRAWINGS

FIG. 1 is a schematic representation of a typical jet turbine engine;

FIG. 2 is a partial view of an inlet lip including the swirl nozzle;

FIG. 3 is a schematic representation of the swirl nozzle assembly;

FIG. 4 is a temperature profile of a high temperature gas stream moving through an annular housing volume of an inlet lip;

FIG. 5 is a temperature profile of a high temperature gas stream moving through one or more vanes within an annular housing volume of an inlet lip;

FIG. 6 is a cross-sectional schematic view of a high temperature gas stream moving through one or more vanes within an annular housing volume of an inlet lip;

FIG. 7 is a cross-sectional schematic view of one or more vanes within an annular housing volume of an inlet lip.

DETAILED DESCRIPTION OF THE INVENTION

Figure 1:
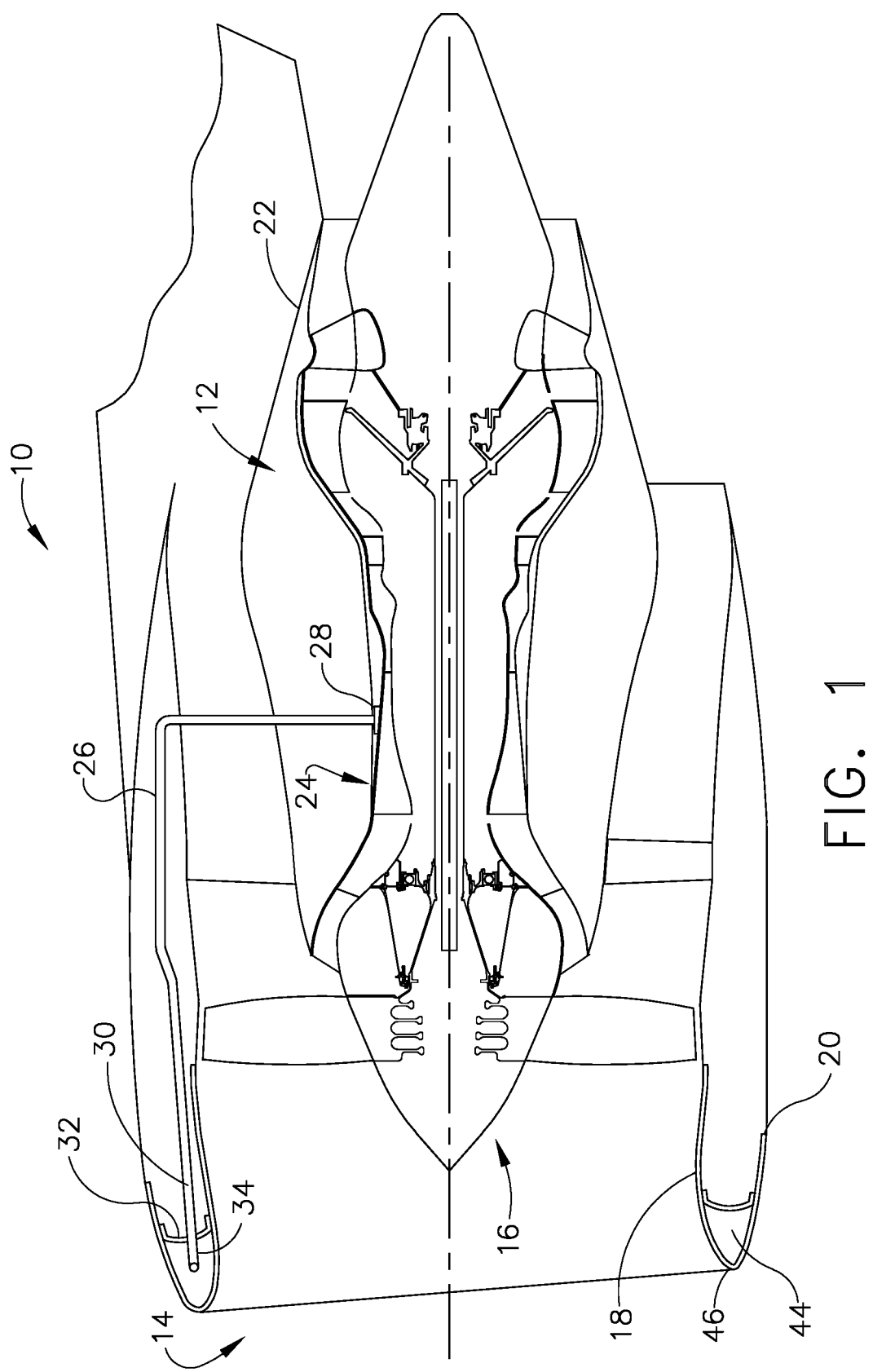
FIGS. 1-7 show exemplary embodiments of the method and apparatus described herein.

Referring now to the drawings in detail and in particular to FIG. 1, there is seen a schematic representation of a jet turbine engine 10 of the type suitable for aircraft propulsion. Turbine engine 10 is housed within a central housing 12. Ambient air enters engine 10 through an air inlet section 20, between spinner 16 of engine 10 and inlet lip 14 formed in part from an annular outer shell 46 which constitutes the forward most portion of air inlet section 20 of engine 10, some components of which have been omitted from FIG. 1 for simplicity. Engine thrust is produced by burning incoming air and fuel within central housing 12 and passing the resulting hot, high pressure propulsion gases through exhaust outlet 22 and out rear exit 42 of engine 10.

In flight, ice tends to form on inlet lip 14 (in addition to other aircraft components omitted for simplicity). The ice changes the profile of inlet 18 defined between inlet lip 14 and spinner 16, adversely affecting the required quantity, flow path and quality of incoming air to engine 10. Also, pieces of ice may periodically break free from these components and enter engine 10, damaging rotor blades and other internal engine components (not illustrated).

Within compressor section 24 of jet engine 10 is a region containing hot gases. A suitable conduit 26 is operatively connected at a first end 28 to this region containing hot gases to provide a means of extracting a portion of the hot gases from this region. In one embodiment, the region containing hot gases is the environmental bleed air manifold, although in other embodiments the region containing hot gases may be any other suitable region or hot air source of engine 10 including, but not limited to, the compressor discharge bleed air manifold. Second end 30 of conduit 26 penetrates a bulkhead 32 that substantially closes annular outer shell 46 of inlet lip 14 to enclose an annular housing volume 44 containing a quantity of air.

Figure 2:
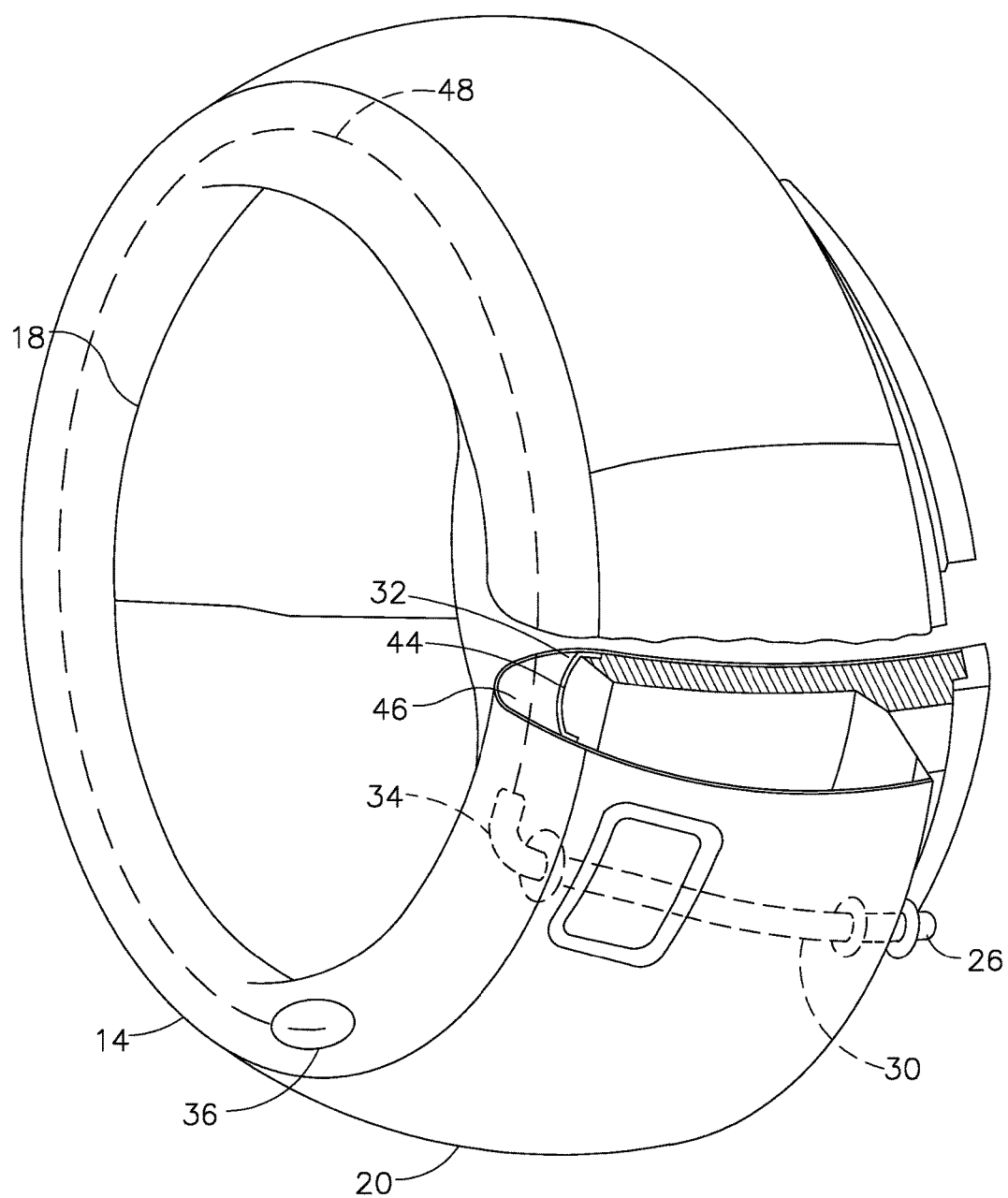

Conduit 26 carrying the hot, high pressure gas from compressor section 24 of engine 10 extends through bulkhead 32 and ends in an outlet nozzle 34 connected to second end 30 of conduit 26. Outlet nozzle 34 is preferably bent substantially 90 degrees so that outlet nozzle 34 is aligned approximately tangential to a circumferential centerline 48 of annular housing volume 44, as illustrated in FIG. 2. In other embodiments the angle at which outlet nozzle 34 is bent may be substantially greater or less. In even more embodiments, outlet nozzle 34 may be rotated with respect to any other axis and translated either up or down and fore or aft within annular housing volume 44 of inlet lip 14.

Figure 3:
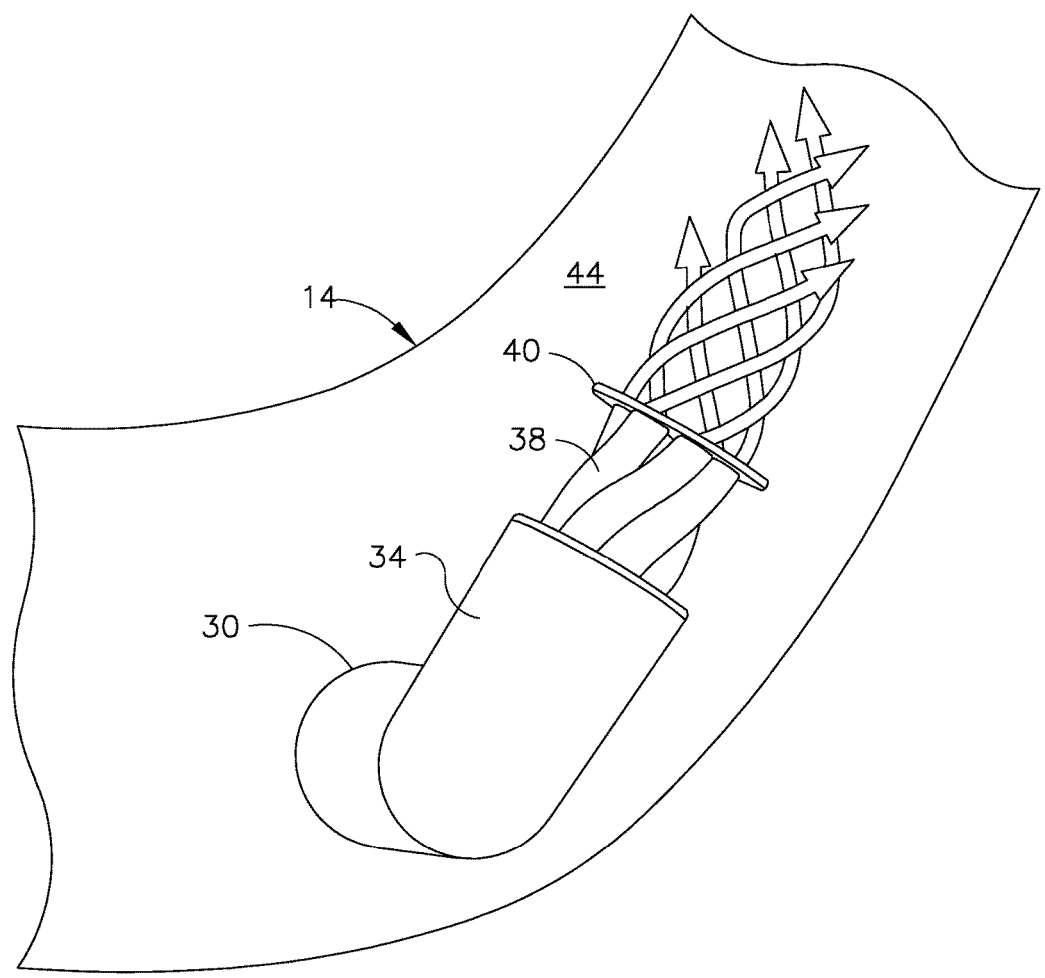

In various embodiments, nozzle 34 is configured to impart a rotational flow as hot gases exit nozzle 34. In one embodiment, illustrated in FIG. 3, nozzle 34 contains a plurality of fluid flow passages 38 twisted in a helical pattern. In the preferred embodiment, four to six fluid flow passages 38 are used, however in other embodiments the number of passages could be substantially more or less. Additionally other means may be used to cause the rotation including but not limited to internal vanes or nozzles. As the hot gases move inside nozzle 34, fluid flow passages 38 impart a rotational movement to the hot gases and direct the hot gases out from nozzle outlet 40 into annular housing volume 44 of inlet lip 14. It will be recognized that the directing of the hot gases into the air within annular housing volume 44 of inlet lip 14 imparts momentum to the air stream and will cause the initial mass of air to rotate within annular housing volume 44 in a swirling rotational direction. Shortly after initiation of the hot air jet flow, housing volume 44 is filled with the hot gas introduced via outlet nozzle 34. Hot gas will continue to swirl around annular housing volume 44 while outlet nozzle 34 is in operation. Also, as seen in FIG. 2, as the mass of hot gas rotates within annular housing volume 44 of inlet lip 14, a suitable exhaust means, shown as suitably sized holes 36 formed in an outboard position of annular outer shell 46 of inlet lip 14, permits a portion of the hot air gas mass to escape annular housing volume 44 of inlet lip 14 at a mass flow rate matched to the mass flow rate of hot gases being directed into annular housing volume 44 of inlet lip 14 to maintain an equilibrium of flow. In other embodiments holes 36 may be located in other areas including but not limited to a rear region of inlet lip 14.

It will be recognized that as the hot gases are directed by nozzle 34 into annular housing volume 44 of inlet lip 14, a thermal equilibrium state will be reached after a transition period for a given set of operational conditions. Thermal energy is transferred from the hot gases by convection to inner surface 62 of annular outer shell 46 of inlet lip 14, is then transferred by thermal conduction through the material of annular outer shell 46 and finally is removed from the material of annular outer shell 46 by convection to the external ambient air stream. In this way, the annular outer shell 46 of inlet lip 14 is heated and subsequently kept free of ice. With nozzle 34 and the mixing of the hot, high pressure gas and the circulating gas stream contained within annular housing volume 44 of inlet lip 14, the jet stream impingement temperature is lower than the temperature at which the jet exits nozzle 34. However, there still remains a significant localized heating in a region of direct jet stream impingement 52 on inner surface 62 of annular outer shell 46.

To reduce an impingement of hot gases and excessive heating at localized regions of inlet lip 14, the flow rate of the hot gases directed by nozzle 34 into annular housing volume 44 of inlet lip 14 are limited to a maximum flow rate. If this flow rate exceeds the maximum flow rate, a high temperature gas stream 50 may aggressively impinge inner surface 62 of annular outer shell 46 of inlet lip 14 at impingement region 52, thus thermally loading this localized region 52 more intensely than desired. This condition unfavorably impacts the efficiency of system 1, because it leaves less thermal energy available for anti-icing work along the remainder of the circumference of inlet lip 14. By way of non-limiting example, impingement may occur at an outer circumference 54 of annular housing volume 44. Because this impinging stream 50 imparts an aggressive thermal load, structures within impingement region 52 including, but not limited to, annular outer shell 46 and bulkhead 32, are vulnerable to overheating and potential structural degradation due to heat damage.

Figure 5:
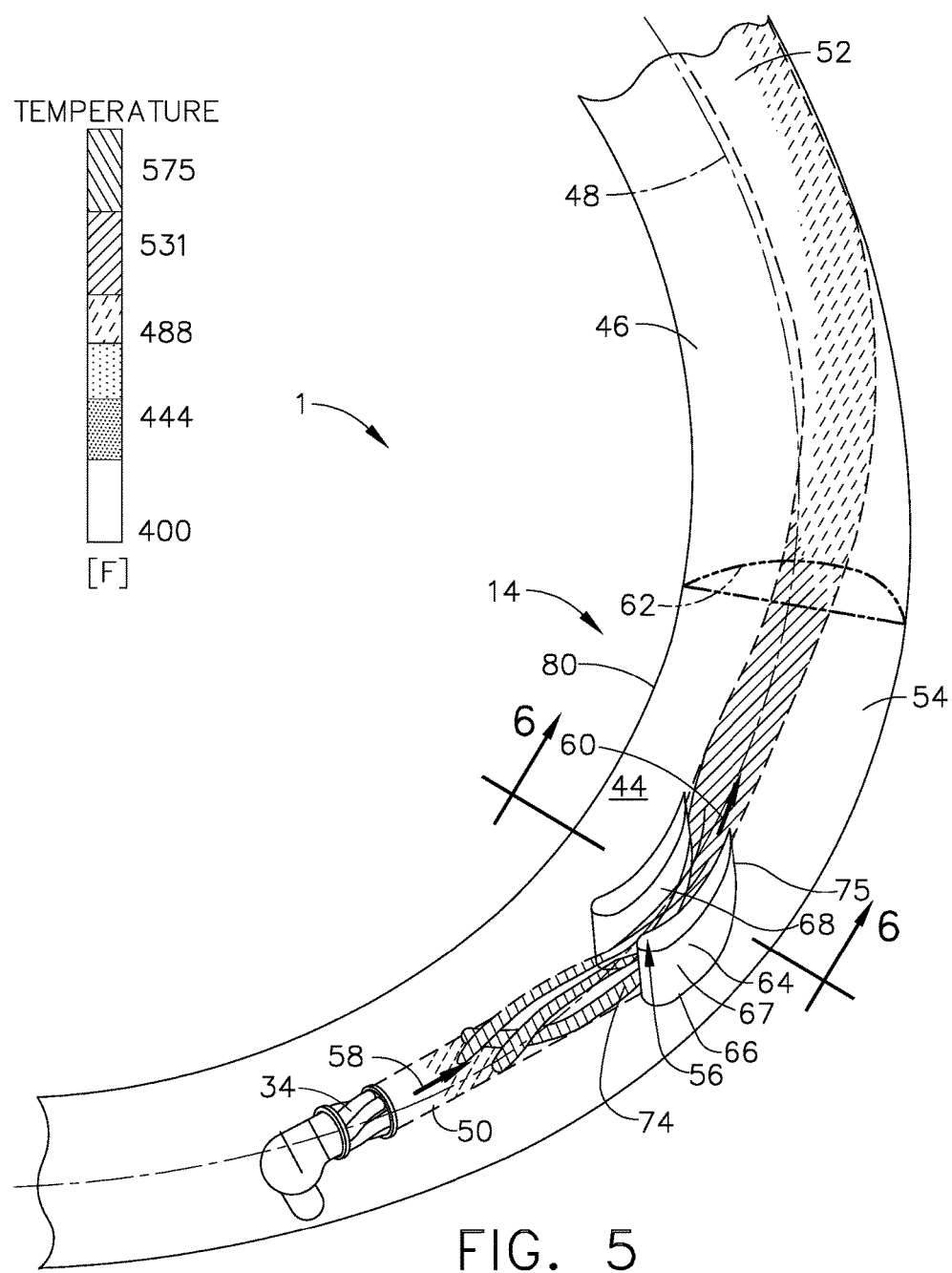

In various embodiments, one or more vanes 56 are positioned within annular housing volume 44 of inlet lip 14 as part of an anti-icing system 1, illustrated in FIG. 5. One or more vanes 56 are configured to redirect high temperature gas stream 50 directed by nozzle 34 at a first direction 58 to a second direction 60. By redirecting the travel of the high temperature gas stream 50, the jet stream impingement is delayed to a more downstream impingement region 52 allowing additional time to impart momentum to the circulating gas stream, thus reducing the intensity of the jet gas stream and producing a more uniform flow and temperature field. The result is less potential for structural degradation and an increase in system efficiency. This delay in impingement of the heated gas stream 50 reduces early heat loss to surrounding structures, thereby making more thermal energy available from stream 50 to the circulating air, resulting in more even distribution of heating over inner surface 62 of annular outer shell 46.

Figure 6:
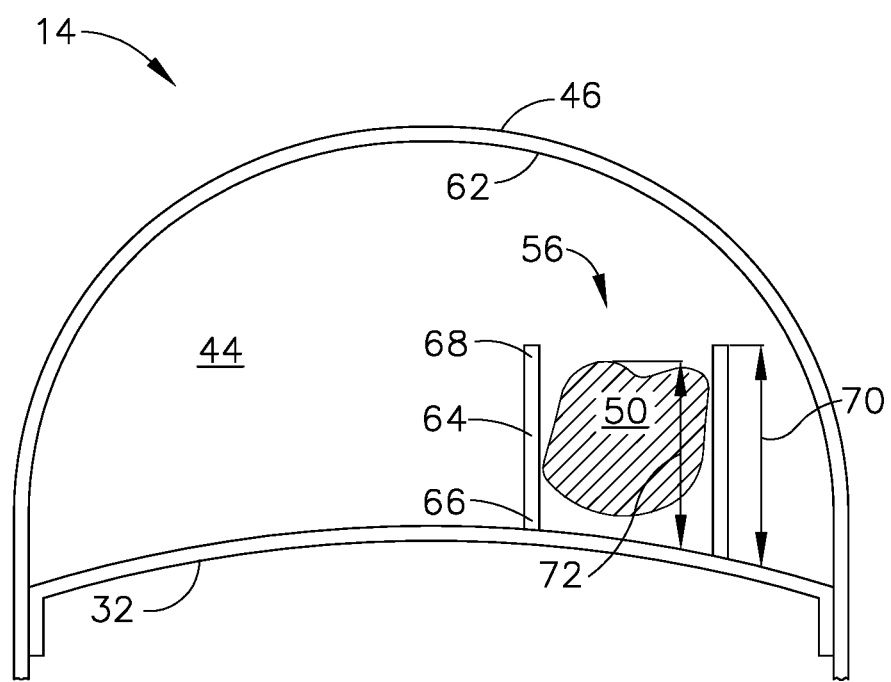

Referring again to FIG. 5, one or more vanes 56 are positioned downstream from nozzle 34. As illustrated in FIG. 6, each vane 64 of one or more vanes 56 includes a first end 66 attached to bulkhead 32, a free end 68 opposite to first end 66, and a vane body 67 therebetween. Each vane 64 extends from bulkhead 32 into annular housing volume 44 without attaching to annular outer shell 46. Without being limited to any particular theory, it is thought that attaching one or more vanes 56 to annular outer shell 46 may provide a conductive path by which heat from high temperature gas stream 50 may locally transfer to bulkhead 32, potentially reducing the efficiency of system 1.

As illustrated in FIG. 6, each vane 64 extends from bulkhead 32 to a vane height 70. In various embodiments, vane height 70 is configured to be greater than or equal to a corresponding height 72 of stream 50 as stream 50 impinges one or more vanes 56. In this embodiment, the vane height 70 ensures that one or more vanes 56 capture and redirect stream 50 from first direction 58 to second direction 60.

Referring again to FIG. 5, each vane 64 includes a leading edge 74 positioned downstream of nozzle 34 and a trailing edge 75 positioned downstream of leading edge 74. Leading edge 74 is aligned with first direction 58 of stream 50 and trailing edge 75 is aligned with second direction 60. First direction 58 corresponds to the direction at which stream 50 impinges on each vane 64. Without being limited to any particular theory, aligning leading edge 74 with first direction 58 enables a smooth interaction between stream 50 and each vane 64 with minimal turbulence or spillage, thereby reducing fluid dynamic drag and associated blockage within annular housing volume 44.

Figure 4:
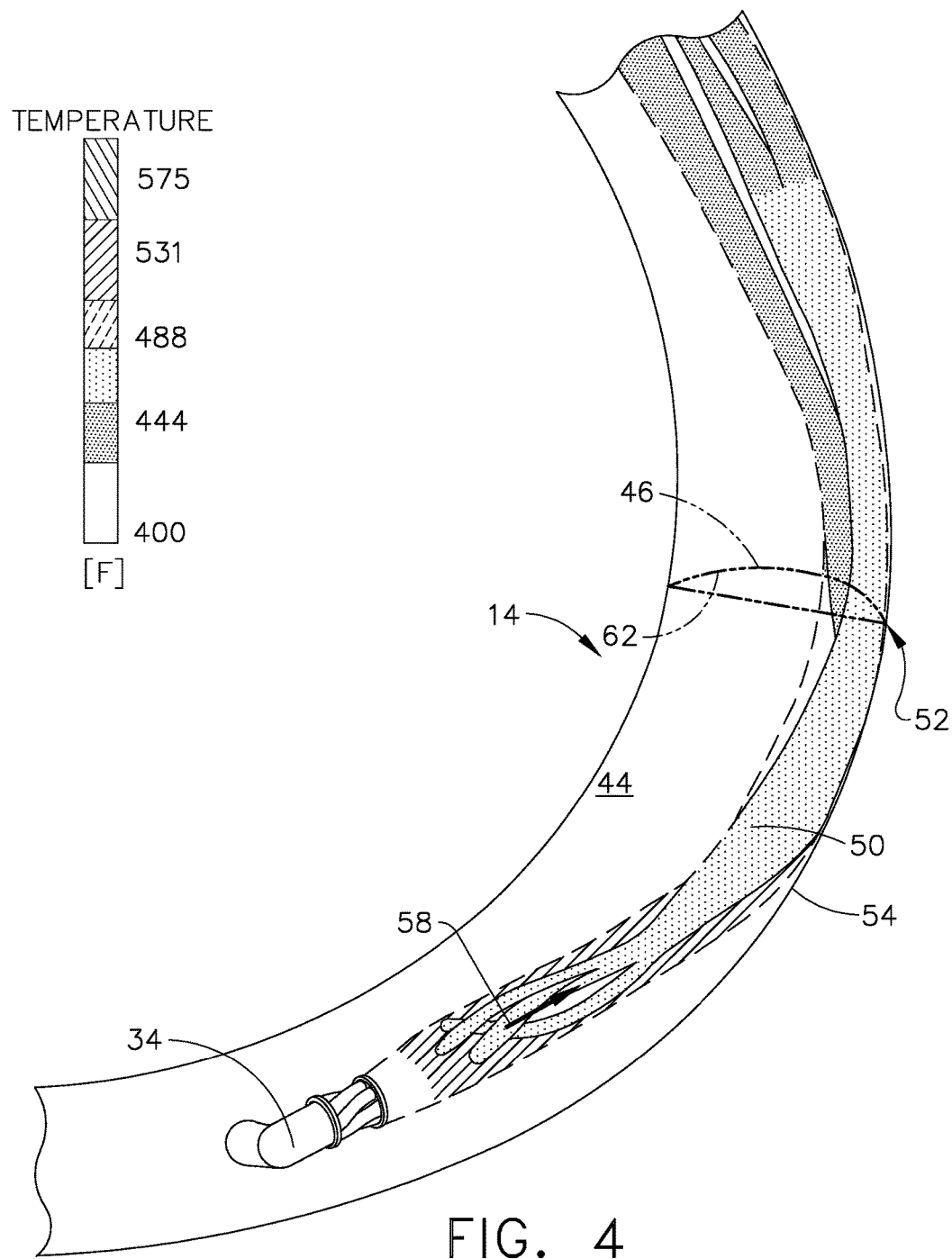

Trailing edge 75 is aligned with second direction 60. In various embodiments, second direction is configured to reduce a direct impingement of high temperature gas stream 50 on inner surface 62 of annular outer shell 46 of inlet lip 14. Typically, high temperature gas stream 50 travels in a first direction 58 as directed by nozzle 34 until stream 50 encounters a surface, such as inner surface 62 of annular outer shell 46 of inlet lip 14 at outer circumference 54, as illustrated in FIG. 4. In various embodiments, second direction 60, to which trailing edge 75 is aligned, is directed toward inner circumference 80, as illustrated in FIG. 5. After the travel of stream 50 is redirected at a first turn angle from first direction 58 to second direction 60 by one or more vanes 56, stream 50 proceeds downstream along second direction 60 until stream 50 impinges inner wall 62 of annular outer shell 46 at outer circumference 54. However, because stream 50 has had additional time and distance travelled within annular housing volume 44, stream 50 has been measurably cooled by mixing with cooler surrounding air in volume 44. As a result, the temperature of stream 50 at impingement region 52 is below a temperature that may potentially overheat surrounding structural elements, and more thermal energy in hot gas stream 50 is available for downstream anti-icing of inlet lip 14.

In various embodiments, each vane 64 may have any profile between leading edge 74 and trailing edge 75 without limitation. In one embodiment, each vane 64 is provided with a curved profile that gradually transitions from alignment with first direction 58 at leading edge to alignment with second direction 60 at trailing edge 75, as illustrated in FIG. 5. In another embodiment, each vane 64 includes at least two planar facets between leading edge 74 and trailing edge 75 (not illustrated). In this embodiment, each vane 64 includes a first facet aligned with first direction 58 that includes leading edge 74 and at least a portion of remaining vane 64, as well as a second facet aligned with second direction 60 that includes trailing edge 75 and at least a portion of remaining vane 64.

In various other embodiments, each vane 64 may have any thickness profile between leading edge 74 and trailing edge 75 without limitation. In one embodiment, each vane 64 may be slab-like (see FIG. 5), as characterized by a constant thickness from leading edge 74 and trailing edge 75. In this embodiment, leading edge 74 and trailing edge 75 may be independently provided with an edge profile including, but not limited to: a flat (square) edge, a rounded edge, a faceted edge including two or more facets, or an edge profile tapering to a sharp edge. In another embodiment, each vane 64 may be provided with a thickness profile corresponding to any known airfoil profile without limitation. In this embodiment, the thickness profile may be constant at each distance from bulkhead 32 (see FIG. 6), or the thickness profile may change as a function of distance from bulkhead 32. By way of non-limiting example, each vane 64 may taper from a thicker profile at first end 66 to a thinner profile 68 at free end 68, or vice-versa. In another embodiment, each vane 64 may be provided with one or more flow entrainment feature including, but not limited to an end plate attached to free end 68, to enhance the capture and redirection of high temperature gas stream 50.

Figure 7:
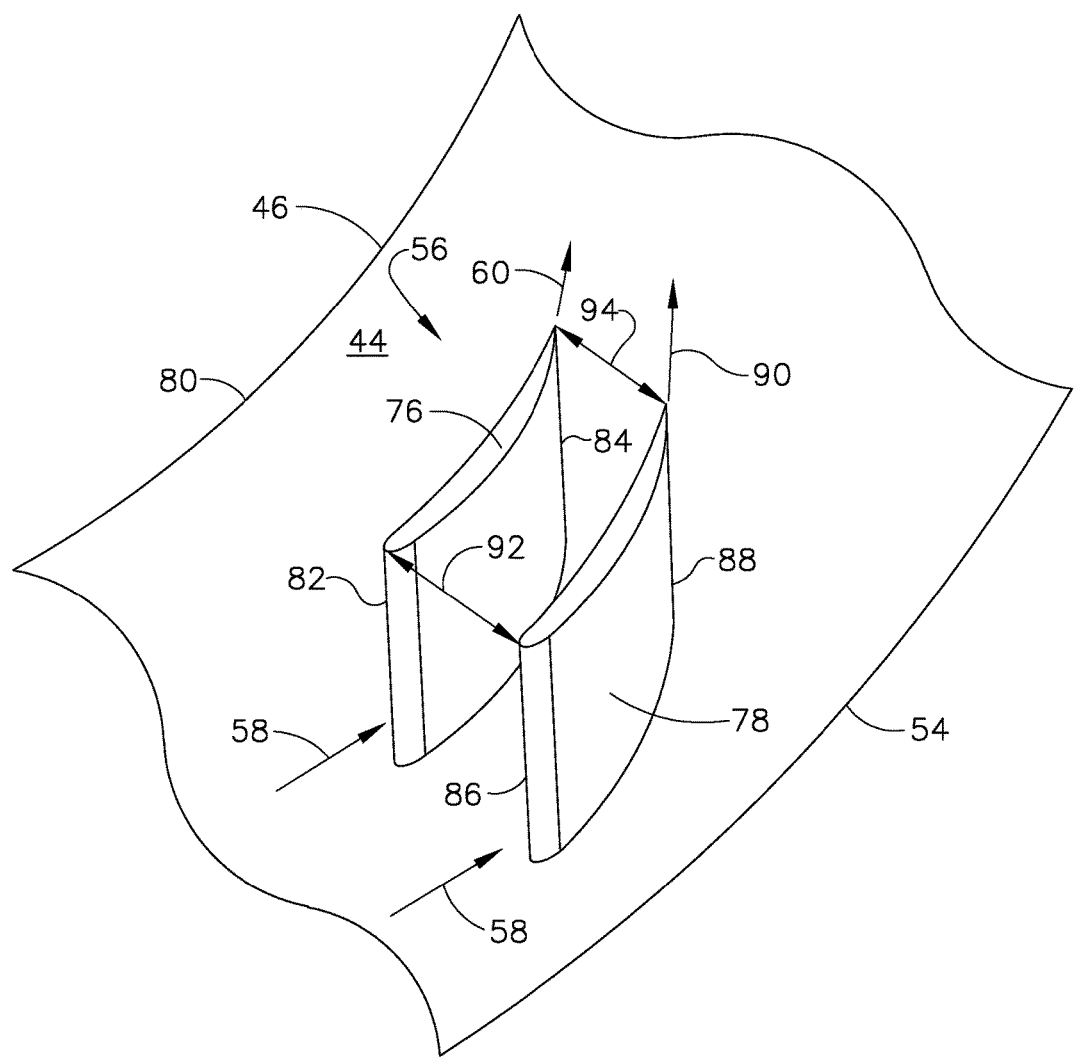

In various embodiments, one or more vanes 56 include at least one vane, at least two vanes, at least three vanes, at least four vanes, or at least five vanes. In one exemplary embodiment, one or more vanes 56 include a first vane 76 and a second vane 78, as illustrated in FIG. 7. In this embodiment, first vane 76 is situated closer to an inner circumference 80 of annular housing volume 44 relative to second vane 78. First vane 76 includes a first leading edge 82 positioned downstream of nozzle 34 (not illustrated) and a first trailing edge 84 positioned downstream of first leading edge 82. Second vane 78 includes a second leading edge 82 positioned downstream of nozzle 34 (not illustrated) and a second trailing edge 88 positioned downstream of second leading edge 86.

Referring again to FIG. 7, first leading edge 82 and second leading edge 86 are both aligned with first direction 58, which is aligned with the direction at which high temperature gas stream 50 impinges first vane 76 and second vane 78. First trailing edge 84 is aligned with second direction 60 to redirect high temperature gas stream 50 toward inner circumference 80 as described above. Second trailing edge 88 is aligned with a third direction 90 configured to redirect a portion of high temperature gas stream 50 positioned nearer to outer circumference 54 toward inner circumference 80 to delay the impingement of stream 50 on inner surface 62 of annular outer shell 46 of inlet lip 14. Because second vane 78 is positioned closer to outer circumference 54 than first vane 76, third direction 90 to which second trailing edge 88 is aligned redirects stream 50 through a second turn angle directed more toward inner circumference 80 relative to first turn angle from first direction 58 to second direction 60.

Referring again to FIG. 7, in one embodiment first leading edge 82 and second leading edge 86 are separated by a leading edge gap 92. In this embodiment, leading edge gap 92 is configured to be sufficiently wide for the capture of high temperature gas stream 50 between first vane 76 and second vane 78 (see FIG. 6). In addition, first trailing edge 84 and second trailing edge 88 are separated by a trailing edge gap 94. In one embodiment, leading edge gap 92 is similar to trailing edge gap 94, resulting in relatively uniform spacing between first vane 76 and second vane 78 from leading edges 82/86 to trailing edges 84/88. In another embodiment, trailing edge gap 94 is smaller relative to leading edge gap 92, resulting in a gradual reduction of the separation distance between first and second vanes 76/78. Without being limited to any particular theory, this reduction in the separation distance may function like a nozzle to increase the flow speed of high temperature gas stream 50 exiting first and second vanes 76/78, thereby enhancing the mixing and movement of air warmed by stream 50 within annular housing volume 44 within inlet lip 14.

In various embodiments, anti-icing system 1 may be used to enable a method for preventing icing of an inlet lip 14 of an aircraft engine 10 by directing a high temperature gas stream 50 into an annular housing volume 44 and redirecting stream 50 at a first turn angle from a first direction 58 to a second direction 60 configured to reduce a direct impingement of stream 50 on inner surface 62 of annular outer shell 46 of inlet lip 14 as described above. In various other embodiments, anti-icing system 1 described herein above may be incorporated into a propulsion system of an aircraft to prevent icing of an inlet of a jet turbine engine 10 of the propulsion system.

Figure 8A:
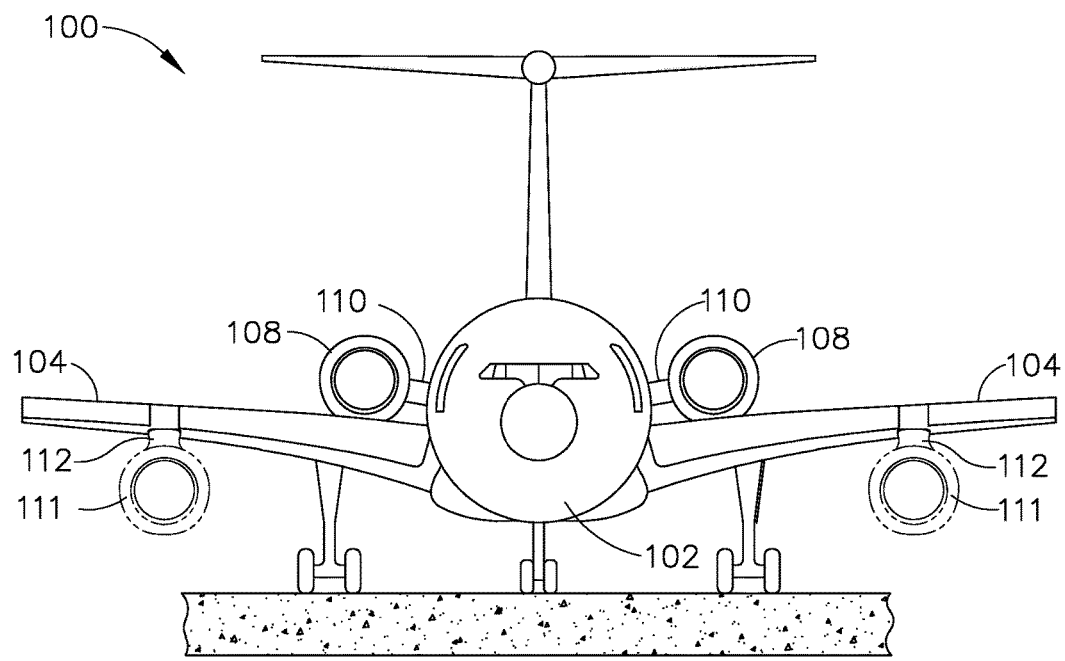
FIG. 8A is a front view of a jet aircraft with an anti-icing system.
Figure 8B:
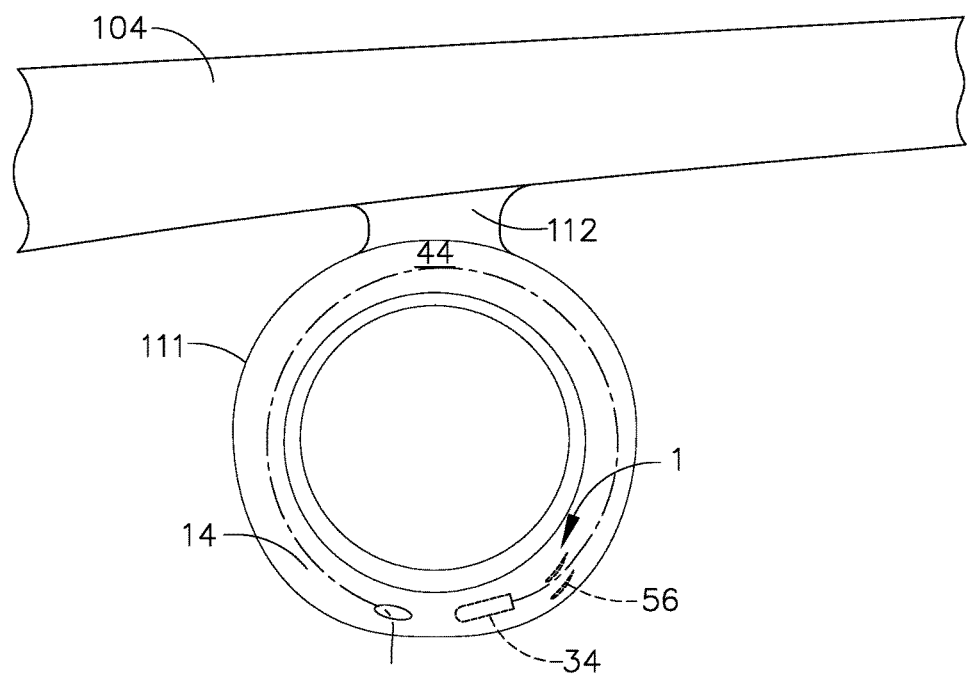
FIG. 8B is a close-up view of an engine nacelle of the aircraft illustrated in FIG. 8A.

FIG. 8A is a schematic view of an aircraft 100 including a fuselage 102 and a pair of wings 104. In one embodiment, aircraft 100 includes a pair of fuselage-mounted engine assemblies 108 coupled to, and extend outboard from, fuselage 102 via a pair of mounting structures, i.e., a pair of fuselage pylons 110. Wing-mounted engine assemblies 111 are suspended downward from wings 104 via a pair of mounting structures, i.e., a pair of wing pylons 112. Fuselage pylons 110 and wing pylons 112 may be coupled to fuselage 102 and wings 104, respectively, using any suitable coupling arrangement (e.g., a bolted arrangement). Wing-mounted engine assemblies 111 and fuselage-mounted engine assemblies 108 are substantially similar with the exception of mounting orientation. FIG. 8B is a close-up view of one wing-mounted engine assembly 111. Wing-mounted engine assembly 111 includes inlet lip 114 enclosing annular housing volume 44.

As illustrated in FIG. 8B, inlet lip 114 of aircraft 100 further includes anti-icing system 1. Anti-icing system 1 includes one or more vanes 56 positioned downstream of nozzle 34 as described above. Nozzle 34 is configured to direct a high temperature gas stream into annular housing volume 44 in a first direction and one or more vanes 56 are configured to redirect the high temperature gas stream through a first turn angle from the first direction to a second direction as described above. The second direction is configured to reduce a direct impingement of the high temperature gas stream on an inner surface of the inlet lip as described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft anti-icing system comprising:
an inlet lip comprising an outer shell attached to a bulkhead, said inlet lip enclosing an annular housing volume; and
one or more vanes extending from said bulkhead into said annular housing volume, said one or more vanes including a first vane and a second vane, said first vane is positioned closer to an inner circumference of said annular housing volume relative to said second vane, each of said first vane and said second vane comprising a first end coupled to said bulkhead, a free end extending into said annular housing volume, and a vane body extending between said first end and said free end;
said first and second vanes are positioned downstream from a nozzle configured to direct a high temperature gas stream into said annular housing volume in a first direction, said first vane having a first leading edge aligned with said first direction and positioned downstream of said nozzle and a first trailing edge aligned with a second direction and positioned downstream of said first leading edge, said second vane having a second leading edge aligned with said first direction and positioned downstream of said nozzle and a second trailing edge aligned with a third direction and positioned downstream of said second leading edge, wherein:
said first vane is configured to redirect said high temperature gas stream through a first turn angle from said first direction to said second direction towards an inner circumference of said annular housing volume, said second direction configured to reduce a direct impingement of said high temperature gas stream on an inner surface of said inlet lip;
said second vane is configured to redirect said high temperature gas stream through a second turn angle from said first direction to said third direction toward the inner circumference of said annular housing volume; and
said second turn angle is directed more toward the inner circumference relative to said first turn angle.

2. The system in accordance with claim 1, wherein said free end of the first vane and said free end of the second vane extends from the bulkhead to a vane height that is higher than a corresponding height of said high temperature gas stream from said bulkhead as said high temperature gas stream impinges said one or more vanes.

3. The system in accordance with claim 1, wherein the first and second vanes each comprise an airfoil profile extending from said first leading edge to said first trailing edge for said first vane and from said second leading edge to said second trailing edge for said second vane.

4. The system in accordance with claim 1, wherein said first and second leading edges are separated by a leading edge gap, said leading edge gap configured to capture said high temperature gas stream between said first and second vanes.

5. The system in accordance with claim 4, wherein said first and second trailing edges are separated by a trailing edge gap that is narrower than said leading edge gap.

6. A method for preventing icing of an inlet lip of an aircraft engine, said method comprising:
directing a high temperature gas stream at a first direction from a nozzle into an inlet lip comprising an outer shell attached to a bulkhead, the inlet lip enclosing an annular housing volume;

redirecting the high temperature gas stream through a first turn angle from the first direction to a second direction using a first vane positioned downstream from the nozzle, the second direction directed toward an inner circumference of the inlet lip and configured to reduce a direct impingement of the high temperature gas stream on an inner surface of the inlet lip;

redirecting the high temperature gas stream through a second turn angle from the first direction to a third direction using a second vane positioned downstream from the nozzle, wherein:

the second vane is positioned farther from the inner circumference of the inlet lip relative to the first vane; and the second turn angle is directed more toward the inner circumference relative to the first turn angle.

7. The method in accordance with claim 6, wherein the first and second vanes each comprise a first end coupled to the bulkhead, a free end extending into the annular housing volume, and a vane body extending between said first end and said free end.

8. The method in accordance with claim 6, wherein the free end of each of the first and second vanes extends from the bulkhead to a vane height that is higher than a corresponding height of the high temperature gas stream from the bulkhead as the high temperature gas stream impinges the one or more vanes.

9. The method in accordance with claim 6, wherein:

the first vane includes a first leading edge aligned with the first direction and positioned downstream of the nozzle and a first trailing edge aligned with the second direction and positioned downstream of the first leading edge; and the second vane includes a second leading edge aligned with the first direction and positioned downstream of the nozzle and a second trailing edge aligned with the third direction and positioned downstream of said second leading edge.

10. The method in accordance with claim 9, wherein the first and second vanes further comprise an airfoil profile extending from the first leading edge to the first trailing edge for the first vane and the second leading edge to the second trailing edge for the second vane.

11. The method in accordance with claim 6, further capturing the high temperature gas stream between the first and second vanes prior to the redirecting the high temperature gas stream.

12. A jet aircraft comprising an anti-icing system, said anti-icing system comprising;

an inlet lip comprising an outer shell attached to a bulkhead, said inlet lip enclosing an annular housing volume; and one or more vanes extending from said bulkhead into said annular housing volume, said one or more vanes including a first vane and a second vane, said first vane is positioned closer to an inner circumference of said annular housing volume relative to said second vane, each of said first and second vanes comprising a first end coupled to said bulkhead, a free end extending into said annular housing volume, and a vane body extending between said first end and said free end;

said first and second vanes are positioned downstream from a nozzle and configured to direct a high temperature gas stream into said annular housing volume in a first direction, said first vane having a first leading edge aligned with said first direction and positioned downstream of said nozzle and a first trailing edge aligned with a second direction and positioned downstream of said first leading edge, said second vane having a second leading edge aligned with said first direction and positioned downstream of said nozzle at a same downstream position as said first leading edge and a second trailing edge aligned with a third direction and positioned downstream of said second leading edge; and said first vane is configured to redirect said high temperature gas stream through a first turn angle from said first direction to said second direction, said second direction configured to reduce a direct impingement of said high temperature gas stream on an inner surface of said inlet lip; and said second vane configured to redirect said high temperature gas stream through a second turn angle from said first direction to said third direction, wherein said second turn angle is directed more toward the inner circumference relative to the first turn angle.

13. The jet aircraft in accordance with claim 12, wherein said free end of the first vane and said free end of the second vane extends from the bulkhead to a vane height that is higher than a corresponding height of said high temperature gas stream from said bulkhead as said high temperature gas stream impinges said one or more vanes.

\* \* \* \* \*